Figure 1:
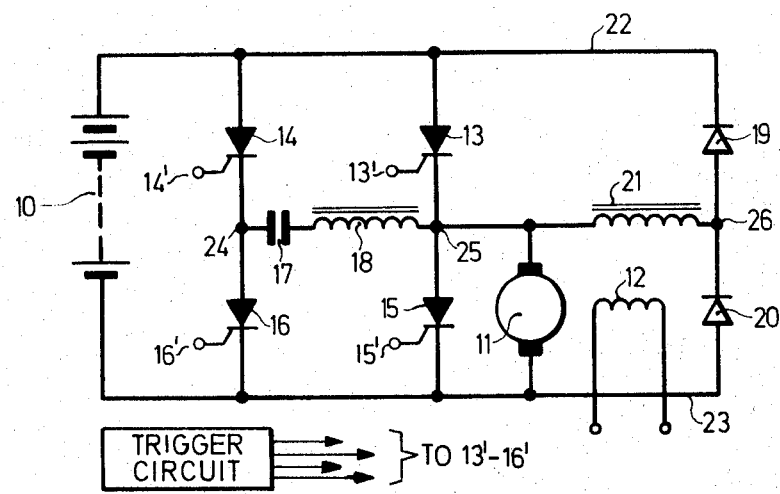

United States Patent [19]
Gerhard

[11] 3,750,002
[45] July 31, 1973

[54] BATTERY CONNECTED DYNAMO ELECTRIC MACHINE SYSTEM

[75] Inventor: Albert Gerhard, Stuttgart, Germany

[73] Assignee: Robert Bosch GmbH, Gerlingen-Schillerhohe, Germany

[22] Filed: Sept. 15, 1972

[21] Appl. No.: 289,280

[30] Foreign Application Priority Data
Sept. 17, 1971 Germany .................. P 21 46 564.5

[52] U.S. Cl. .................. 320/61, 318/139, 318/376, 321/45 C
[51] Int. Cl. .......................... H02j 7/14, H02p 3/14
[58] Field of Search .............. 320/59, 61; 318/138, 318/139, 376; 321/45 C

[56] References Cited
UNITED STATES PATENTS

| | | | |
|---|---|---|---|
| 3,313,998 | 4/1967 | Bunker | 321/45 C |
| 3,349,315 | 10/1967 | Studtmann | 321/45 C |
| 3,546,548 | 12/1970 | Wouk | 318/376 X |
| 3,560,817 | 2/1971 | Amato | 318/139 X |

Primary Examiner—J. D. Miller
Assistant Examiner—Robert J. Hickey
Attorney—Robert D. Flynn, Stephen H. Frishauf et al.

[57] ABSTRACT

To provide for low-loss operation of a dynamo electric machine in motor mode from a battery, and to provide for feedback of energy into the battery in generator mode, a bridge-circuit includes four thyristors connected across a diagonal to the battery, one branch being the supply branch and including a motor mode supply thyristor and a generator mode supply thyristor, in series, and the other branch including a pair of extinction thristors; an inductance and capacitor are connected, in series, across the other diagonal of the bridge to provide a commutating circuit, the armature of the dynamo electric machine being connected in parallel with one of the thyristors in the operating branch. A pair of diodes or suitably triggered thyristors are preferably additionally connected across the battery and having their junction connected to the armature so that one of the diodes, or thyristors, is in connection with the armature to provide for feedback of current into the battery when in generator mode operation.

7 Claims, 2 Drawing Figures

BATTERY CONNECTED DYNAMO ELECTRIC MACHINE SYSTEM

The present invention relates to a dynamo electric machine system and more particularly to the interconnection of a battery with a dynamo electric machine in such a manner that the dynamo electric machine can operate as a motor, driven by the battery, or as a generator and feed power back into the battery, both modes of operation being with a minimum of losses in associated control equipment.

Dynamo electric machines in which direct current is provided to a shunt-wound dc machine in pulse form from a battery have been previously proposed. A bridge-circuit including thyristors is used having a diagonal branch in which a commutating capacitor is connected. It has been proposed to provide such a double bridge-circuit utilizing six thyristors. Usually, a double bridge-circuit having six thyristors, has three connected, in series, to the terminals of a battery. A dc dynamo electric machine is connected to the diagonal of one of the bridges, the other diagonal having a commutating capacitor connected therein. This arrangement controls a dc shunt-connected dynamo electric machine in two directions of rotation. Independent of direction of rotation, three thyristors are always in series with the armature of the dc machine. The thyristor voltages thus add, so that, particularly when the supply voltages are low, the losses in the thyristors are appreciable with respect to overall operation and the efficiency of the entire system is low.

DC machines which are used to drive automotive vehicles may not require switch-over of the dc machine in two directions of rotation. Rather, the system should be so constructed that it can drive the vehicle when in motor mode of operation and can supply electrical energy to the battery when in braking mode of operation.

It is an object of the present invention to provide a dynamo electric machine system which can be used to drive automotive vehicles and which provides for interconnection between a dynamo electric machine and battery, supply to the machine being by dc pulses and the machine itself acting as a generator to re-supply the battery by dynamic braking. Additionally, the efficiency of operation should be high and a minimum of series-connected thyristors, preferably only one, should be placed in series with the dc dynamo electric machine so that the overall efficiency of the system is improved with respect to known systems.

SUBJECT MATTER OF THE PRESENT INVENTION

Briefly, a bridge-circuit is provided which has four thyristors, two being series-connected and forming an operating branch and having a motor mode supply thyristor and a generator mode supply thyristor; the other branch includes a series connection of two extinction thyristors. The diagonal end points of the two parallel branches are connected across the battery. A commutating circuit including a commutating capacitor and an inductance are connected across the other diagonal of the bridge circuit, and the armature of a shunt-wound dynamo electric machine is connected in parallel with one of the thyristors of the operating branch, typically the generator mode supply thyristor. Preferably, bypass diodes or thyristors are additionally connected across the battery, one of them being placed in parallel to the armature of the dynamo electric machine to provide for full use of kinetic energy of the dynamo electric machine and feedback of power into the battery.

The circuit is so arranged, that, regardless of whether the dynamo electric machine is operated as a motor or as a generator (that is, under braking conditions), only one thyristor is in series with the armature of the dynamo electric machine, so that the anode-cathode voltage drop of only one thyristor causes a power loss.

Figure 2:
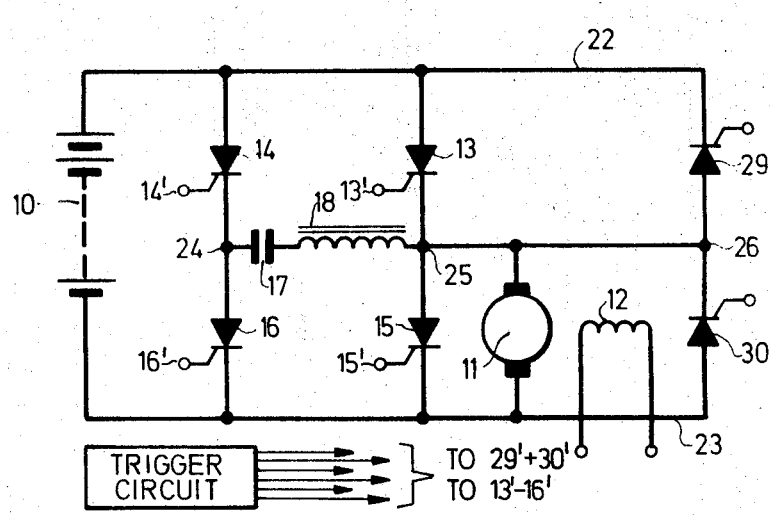

The invention will be described by way of example with reference to the accompanying drawings wherein:

FIG. 1 is a schematic circuit diagram of an embodiment of the present invention and FIG. 2 is a schematic circuit diagram of another embodiment.

Secondary storage battery 10 serves as a source of dc, connected to positive bus 22 and negative 23. A bridge-circuit comprising four thyristors 13 to 16 is connected with one diagonal across buses 22, 23. These thyristors are divided into two branches, an operating branch including a motor mode supply thyristor 13 and a generator mode supply thyristor 15. The other branch has a pair of extinction thyristors 14, 16. The interconnection between the supply thyristor 13, 15 forms a junction 25; the interconnection between the extinction thyristors 14, 16 forms a junction 24. A series oscillating circuit formed of a commutating capacitor 17 and an inductance 18 is connected between junctions 24, 25. The armature 11 of the dynamo electric machine is connected between junction 25 and negative bus 23, that is, in parallel to the generator mode supply thyristor 15. The field winding of the machine is indicated at 12. A pair of series-connected bypass biodes 19, 20 are connected between positive and negative buses 22, 23, poled in blocking direction. The junction 26 between the two bypass diodes 19, 20 is connected over a saturable choke 21 to junction point 25, that is, to the armature 11. The thyristors 13–16 have trigger terminals 13', 14', 15', 16', connected to a trigger circuit 50 to trigger the thyristors into conduction, as well known in the art.

The circuit in accordance with FIG. 2 is similar to that of FIG. 1 and similar elements will not be described again and have been given the same reference numerals. The difference between the circuits essentially is in the substitution of thyristors 29, 30, with gate terminals 29', 30' for the diodes 19, 20. The junction point 26 between the thyristors 29, 30 can then be connected directly to the armature 11 and to junction 25 without interposition of a choke 21. The trigger circuit 52 will also have trigger terminals for thyristors 29, 30.

OPERATION

When operating in the motor mode, the motor supply thyristor 13 is triggered by circuit 50. Current will flow over thyristor 13 from battery 10, positive bus 22, into armature 11 and return over bus 23 to battery 10. The motor-mode supply thyristor can be extinguished by triggering of the extinction thyristor 14 by supplying a potential at gate 14' from trigger circuit 50. Upon firing of thyristor 14, the series oscillatory circuit comprising capacitor 17 and inductance 18 will be energized or started, so that the junction point 25 will momentarily have a voltage which is more positive than that of the positive bus 22, so that thyristor 13 is reversely polarized and will extinguish, until the thyristor 13 is again triggered from pulse source 50 under control, for example, of an external control system. In the periods between trigger pulses, that is, when the thyristor 13 is extinguished, motor current can flow through armature 11 and the bypass diode 20. This motor current will decrease exponentially due to the resistance of the armature 11, the choke 21 and of diode 20.

The inductivity of the choke 21 must be selected to be low so that it does not interfere with current flow over the bypass diode 20 at the ordinary pulse repetition rate, or frequency of firing of the thyristor 13. On the other hand, however, the inductivity must be sufficient that the momentary voltage peaks arising at junction point 25 when the thyristor 13 is extinguished is conducted over armature 11 to negative bus 23 and not over diode 19 to positive bus 22. The pulse duration of the voltage peak is very small with respect to the usual pulse period appearing as output pulses of the thyristor 13, and thus a suitable compromise for the inductivity of choke 21 can be found readily. If, however, in special situations the pulse repetition rate to control thyristor 13 is relatively high, so that the pulses applied to thyristor 13 (and thus derived from thyristor 13) are not very substantially longer than the pulse peaks for commutation, then the circuit of FIG. 2 is suitable. Saturable choke 21 has been omitted; the bypass circuits, diodes 19, 20 in FIG. 1 are, however, replaced by controlled elements, that is, by thyristors 29, 30. Thyristor 30, replacing bypass diode 20, is triggered in synchronism with the extinguishing thyristor 14, so that the bypass thyristor 13 will be conductive only when the supply thyristor 13 is extinguished.

The circuit of the present invention is useful to operate the dynamo electric machine not only as a motor, but also as a generator. When used for dynamic braking, two operating conditions have to be distinguished: above nominal speed of the machine, braking is obtained by increasing current through field winding 12. Below nominal speed, the armature current can be pulsed to obtain braking.

In the braking mode, and when operating above nominal speed, both thyristors 13, 15 are extinguished, that is, do not conduct current. By increasing field current through field 12, the direction of current flow in armature 11 reverses and dynamic braking current will flow from armature 11 over choke 21 and the first bypass diode 19 to battery 10. In the embodiment in accordance with FIG. 2, trigger circuit 52 provides an output trigger voltage at terminal 29' to render thyristor 29 conductive.

In braking mode below nominal speed, even increasing field current will not cause reversal of current flow within armature 11. In order to effect dynamic braking, the braking thyristor 15 is energized. A high short circuit current will flow from armature 11 over thyristor 15. Thyristor 15 is thereupon extinguished quickly by extinction thyristor 16. This extinction is similar to extinction of the motor mode supply thyristor 13: the junction 25 will have a short, momentary negative voltage peak appear thereat which counterbiases thyristor 15 so that current through the braking thyristor 15 is interrupted.

While the braking thyristor 15 was energized, armature 11 will store magnetic energy due to the high short circuit current. As soon as the thyristor 15 extinguishes, the self-induction in the armature winding 11 will provide a high postive voltage peak at the junction point 25. Since both thyristor 13, 15 are blocked, however, the choke 21 and diode 19 will provide a current path for reverse current flow to battery 10 which is only interrupted when the voltage at point 25 falls below that of the battery voltage. At that point, braking thyristor 15 must be again fired. Braking operation, below nominal operating speed thus proceeds in cycles as follows: when the braking thyristor 15 is fired, mechanical energy (that is, the kinetic energy of the dynamo electric machine and, if connected to a vehicle, of the vehicle) is transferred into magnetic energy which, as soon as thyristor 15 extinguishes, is fed back as electrical energy into battery 10. Periodic cycling of the braking thyristor 15 can thus provide for feedback of direct current into the battery even when the dynamo electric machine operates below nominal speed. This substantially increases the range of vehicles in which the system is installed. If the embodiment of FIG. 2 is selected, operation is similar to that previously described except that below nominal operating speed, the bypass thyristor 29 must be fired in synchronism with the extinction thyristor 16 so that it will be conductive when the braking supply thyristor 15 is extinguished.

The circuit thus provides for optimum efficiency by placing only a single thyristor in series with the armature winding 11 and enables operation of the dynamo electric machine as a motor, as well as a generator to effect dynamic braking and simultaneously feed back electrical energy into the battery, regardless of whether operation of the dynamo electric machine, in the braking mode, is above or below nominal speed of the dynamo electric machine.

Various changes and modifications may be made within the scope of the inventive concept.

I claim:

1. Battery connected dynamo electric machine system in which a dc shunt dynamo electric machine is connected to a battery to be supplied with current from the battery when the machine is in motor mode of operation and to supply current to the battery when the machine is in generator mode of operation, comprising
    a bridge circuit including four thyristors (13, 14, 15, 16) connected at one diagonal to the battery and forming a pair of parallel branches having one branch forming the operating branch and having a series connected motor mode supply thyristor (13) and a generator mode supply thyristor (15) and another branch forming an extinction thyristor branch (14, 16);
    and a commutating circuit including a commutating capacitor (17) and an inductance (18), the junctions (24, 25) between the series-connected thyristors of the pairs and forming the other diagonals of the bridge being connected to said commutating circuit;
    the armature (11) of the dynamo electric machine being connected in parallel with one of the thyristors of the operating branch.

2. System according to claim 1 wherein the motor mode supply thyristor in the operating branch is triggered to be conductive when the system is in motor mode of operation and the generator mode supply thyristor of the operating branch is triggered to be conductive when the dynamo electric machine is in generator mode of operation;
    and wherein the armature (11) is connected in parallel with the generator mode supply thyristor (15).

3. System according to claim 1 further comprising a series circuit formed of a pair of diodes (19, 20) having a common junction (26) there between and connected across the terminals of the battery and poled in blocking direction;

and a saturable choke (21) being connected to the junction (25) of the motor mode supply thyristor and the generator mode supply thyristor and the common junction (26) of the diodes.

4. System according to claim 1 further comprising a series circuit formed of a pair of uni-directional current conductive means (19, 20; 29, 30) having a junction (26) therebetween and connected across the terminal of the battery, and poled in blocking direction;

and means connecting the common junction (26) of one of said uni-directional current conductive means (19, 29) to one of the terminals of the battery, one of the terminals of the armature being connected to the other terminal of the battery to permit current flow from the armature to the battery.

5. System according to claim 4 wherein the unidirectional current conductive means comprises a pair of thyristors (29, 30) having their main current path poled in blocking direction with respect to the battery; the common junction (26) between the thyristors (29, 30) being connected directly to the other terminal of the armature.

6. System according to claim 5 further comprising a source of trigger potential (50, 52) to respectively fire the supply thyristors (13, 15) and the extinction thyristors (14, 16) in alternate cycles, said source being additionally connected to synchronously provide triggering pulses to a respective one of said bypass thyristors upon firing of a extinction thyristor to permit current flow from the armature to a respective thyristor when current flow through the supply thyristor is inhibited.

7. System according to claim 6 wherein one of the extinction thyristors controls quenching of the generator mode supply thyristor to interrupt current being supplied by the armature (11) upon operation of the dynamo electric machine as a generator, said source of trigger potential applying, synchronously, pulses to the thyristor (29) connecting the armature to the battery upon extinction of the generator supply thyristor to release energy stored magnetically in the armature in the form of electrical energy for storage in the battery.

* * * * *